Figure 1:
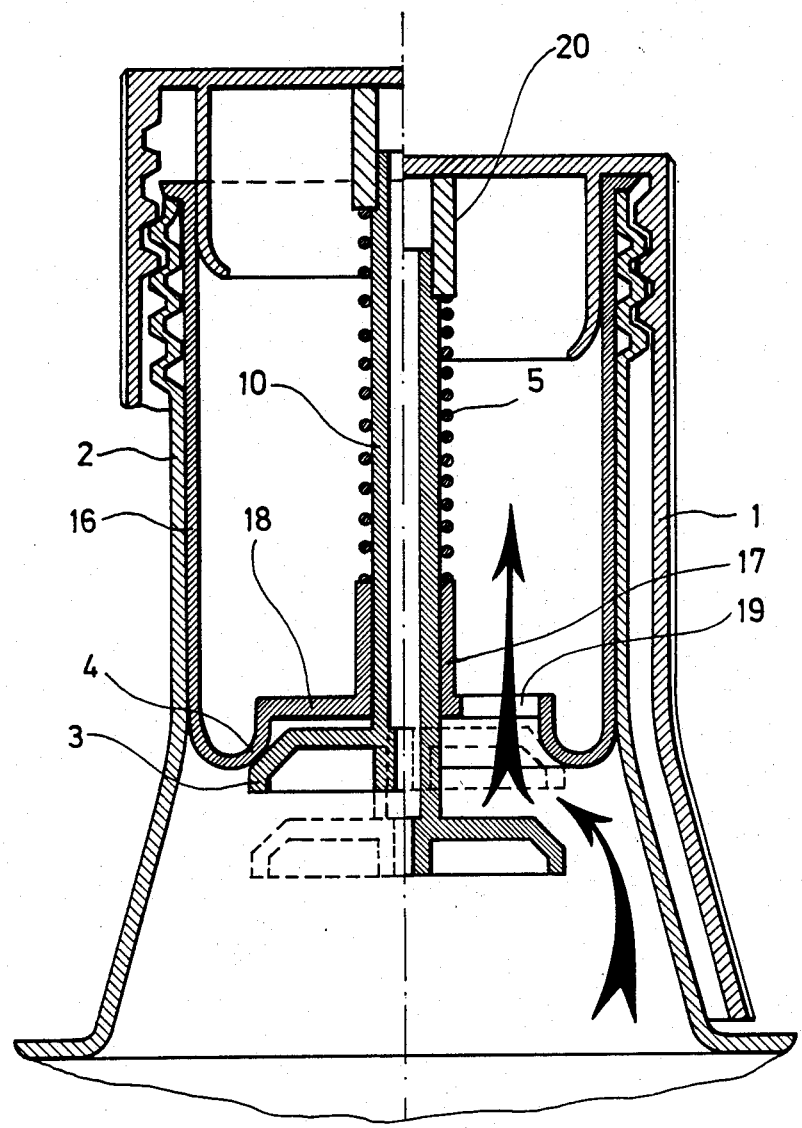

United States Patent [19]

Wassilieff

[11] Patent Number: 4,886,193

[45] Date of Patent: Dec. 12, 1989

[54] CONTAINER CLOSURE CAP WITH METERING APPLIANCE

[75] Inventor: Victor Wassilieff, Paris, France

[73] Assignee: Creanova AG., Zurich, Switzerland

[21] Appl. No.: 68,993

[22] Filed: Jul. 1, 1987

[30] Foreign Application Priority Data

Jul. 8, 1986 [FR] France ................................ 86 09927
Feb. 5, 1987 [FR] France ................................ 87 01415

[51] Int. Cl.$^4$ ............................................. G01F 11/28
[52] U.S. Cl. ..................................... 222/446; 222/454; 141/383
[58] Field of Search ................ 141/353, 356, 360, 383, 141/321, 322, 319, 320, 351; 222/453–455, 448, 449, 518, 446, 447

[56] References Cited

U.S. PATENT DOCUMENTS

| 2,446,085 | 7/1948 | Gronemeyer et al. | 222/454 |
| 2,828,893 | 4/1958 | Stewart et al. | 222/453 |
| 3,451,446 | 6/1969 | Russell | 222/454 |
| 4,128,189 | 12/1978 | Baxter | 222/109 |
| 4,706,829 | 11/1987 | Li | 222/109 |

FOREIGN PATENT DOCUMENTS

| 178217 | 7/1935 | Switzerland | 222/446 |
| 2077886 | 12/1981 | United Kingdom | 141/360 |

Primary Examiner—H. Grant Skaggs
Attorney, Agent, or Firm—Hubbard, Thurman, Turner & Tucker

[57] ABSTRACT

A device for metering a fluid product comprises a closure cap threaded onto the nack of a container and acting on the stem of a valve member to lift the latter of a seat formed at the lower end of a cylindrical wall fixedly inserted into the neck of the container against the action of a resilient member.

A metered dose of the product is dispensed by turning the container upside down and unscrewing the closure cap by then filled with the metered dose.

In the inverted position the fluid product contained in the container flows into a chamber defined by the cylindrical wall via the opened valve member and a passage associated to the resilient element. The flow of the fluid product into the chamber is stopped by the engagement of the valve member with its seat as the closure cap is being unscrewed.

In another embodiment, an intermediate element having a screw-threaded neck portion and a seat for the valve member is secured to an annular rim of a container. A cylindrical wall formed integrally with the seat is in sealingly sliding engagement with a cylindrical wall formed integrally with the bottom wall of the closure cap. A tubular element formed integrally with the cylindrical wall protects the resilient element from contact with the fluid to be dispensed. A metered dose of the product is dispensed by turning the container upside down and unscrewing the closure cap. The screw-threaded peripheral wall of the closure cap remains clean during filling and emptying the metering chamber defined by the cylindrical wall 16.

9 Claims, 12 Drawing Sheets

CONTAINER CLOSURE CAP WITH METERING APPLIANCE

The present invention relates to a device for metering a liquid product contained in a receptable closed by a cap secured to its neck by screw threads or other known means.

According to a first aspect, the invention relates particularly to containers provided with a neck portion of sufficient capacity for containing a predetermined dose of a product to be dispensed.

According to another aspect, the invention is directed to a metering device for use with containers having a very short neck portion or even no neck portion at all. In this case the container may be of any shape or size and made of glass, plastics, metal or any other suitable material.

It is an object of the invention to provide a metering device of extremely simple and inexpensive construction, in which the closure cap of a container is employed as one of the elements of the metering device, and in which the total number of components is reduced relative to that of known devices of this type.

Another object of the invention is to facilitate the use of such metering devices by permitting the user to dispense the desired doses by solely carrying out the operations necessary for closing and opening container closure caps of known construction.

This object is attained according to the first aspect of the invention by fixedly mounting in the neck portion of a container a cylindrical wall having its lower end formed with a seat for an axially displaceable valve member, the axial displacement by said valve member for opening and closing a passage between the interior of the container and the interior of the cylindrical wall being controlled by the displacements of the closure cap for opening and closing the container.

Figure 2:
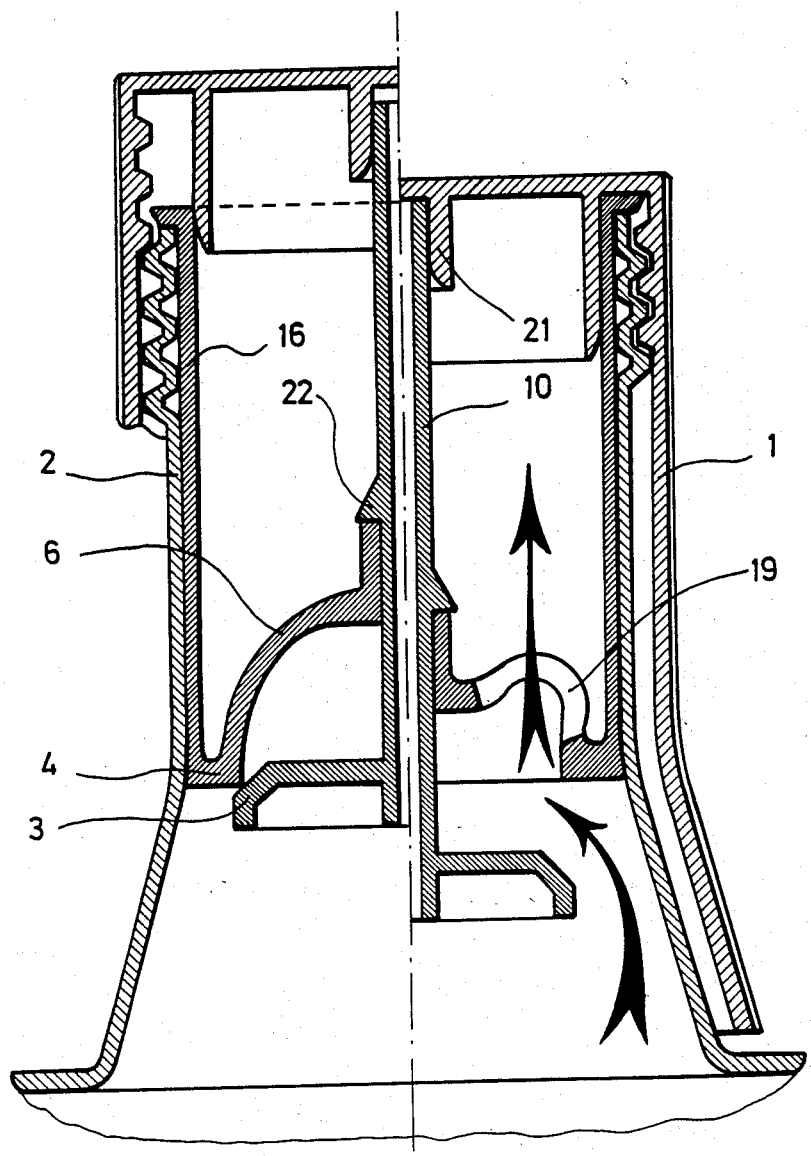

According to an embodiment of the invention shown in FIGS. 1 and 2, axial displacement of the closure cap towards its closed position on the container causes its bottom closure wall to engage the upper end of the stem of the valve member to thereby lift the valve member off its seat for opening the passage between the interior of the container and the interior of the cylindrical wall.

The axial displacement of the closure cap in the opposite sense for removing it from the neck causes the valve stem to be released, permitting a resilient element provided for this purpose to return the valve member onto its seat to thereby close the passage between the interior of the container and the interior of the cylindrical wall before the closure cap is completely removed.

According to a modification of the embodiment described above as shown in FIG. 3, the closure cap has a cambered and deformable bottom closure wall which does not come into contact with the upper end of the valve stem before the closure cap is in the position to hermetically seal the container, and which thus permits the passage between the interior of the receptacle and the interior of the cylindrical wall to be opened independently of the application of the closure cap onto the container's neck by depression of the deformable bottom closure wall.

Figure 4:
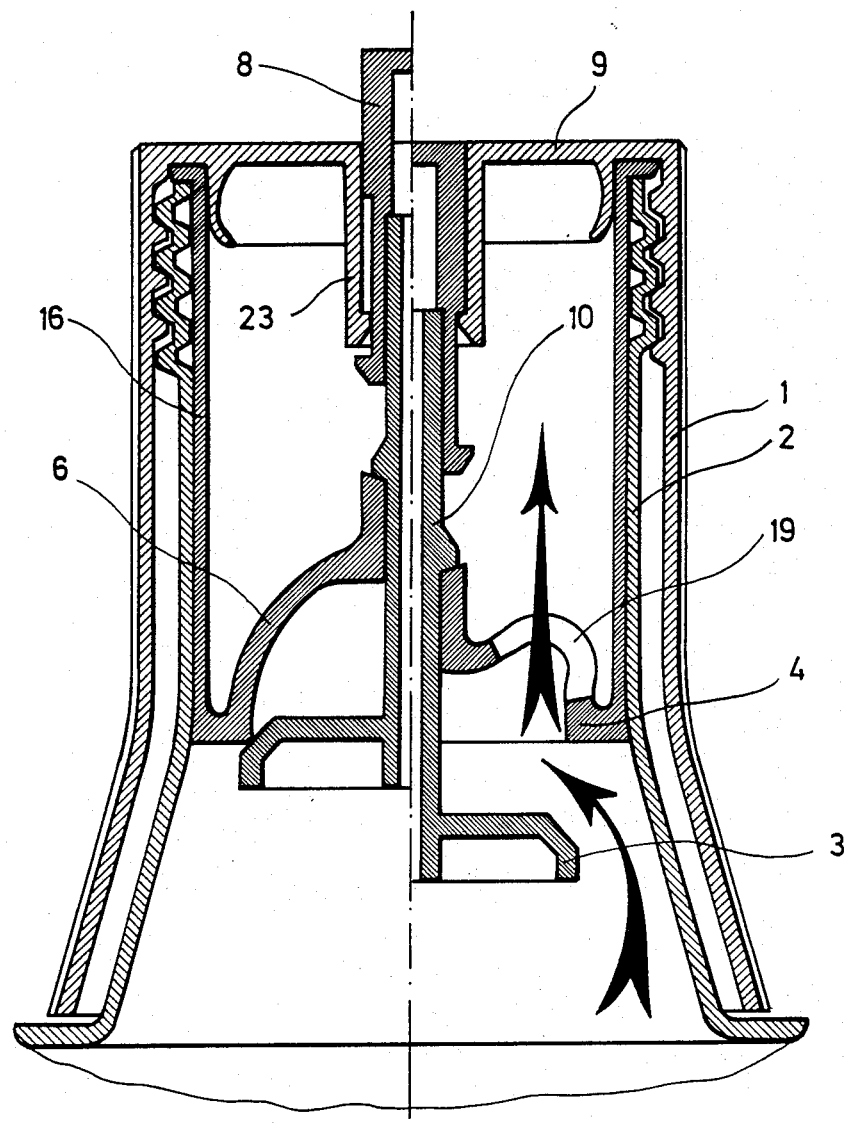

According to another modification of the above decribed embodiment as shown in FIG. 4, a plunger is slidably and sealingly mounted at the center of the rigid closure bottom wall of the closure cap, so that in the closed position of the closure cap the upper end of the valve stem is in contact with the lower end of the plunger.

Figure 5:
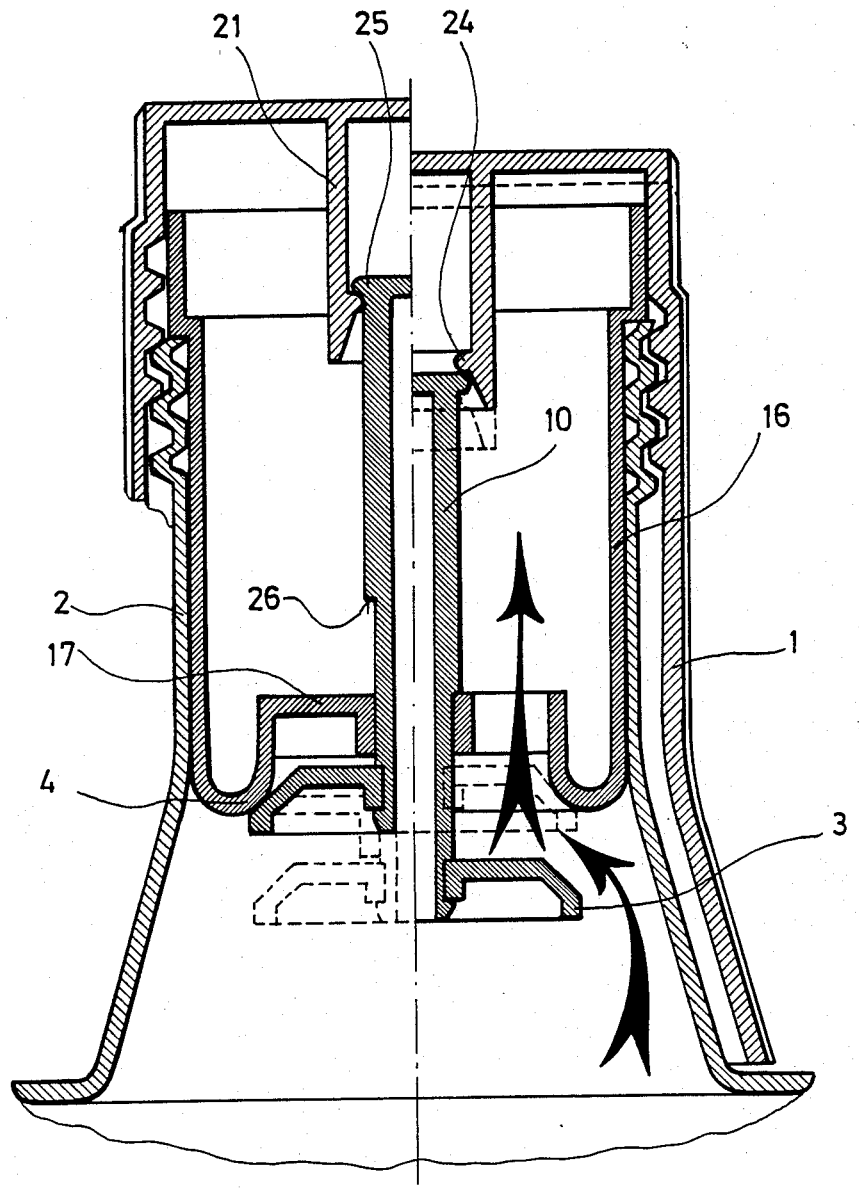

According to another embodiment shown in FIG. 5, The opening and closing of the passage between the interior of the container and the interior of the cylindrical wall is brought about without the aid of a resilient element by means of the closure cap itself adapted to directly act on the valve stem in opposite directions to thereby open the passage during its displacement towards the closure position and to close the passage during its removal from the container's neck.

Figure 7A:
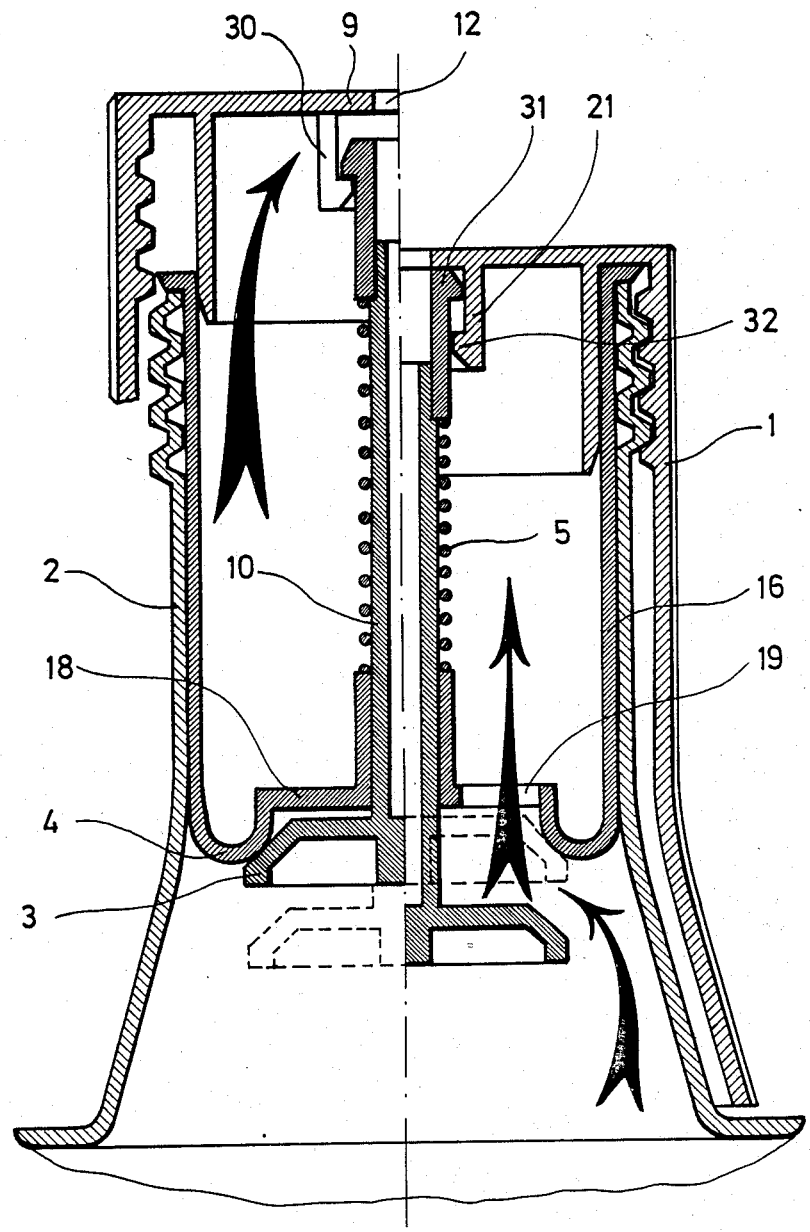
Figure 7B:
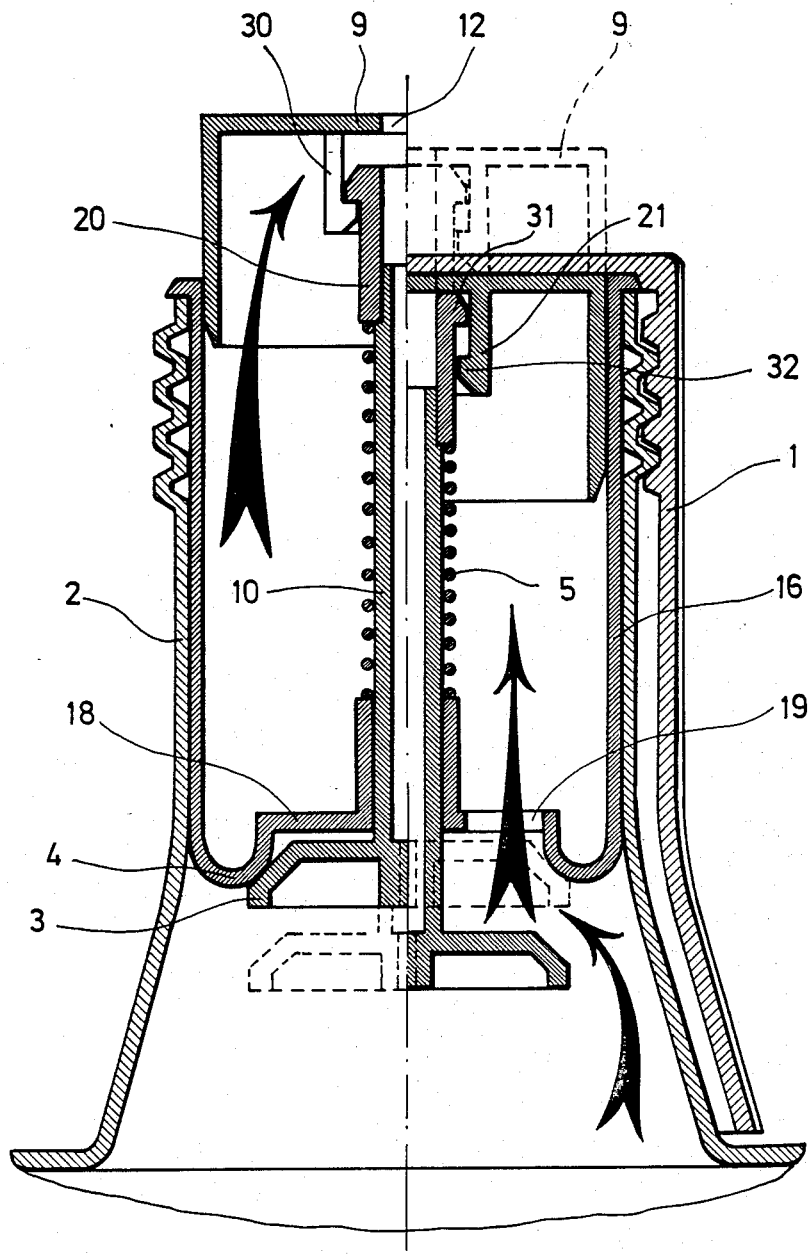
Figure 8:
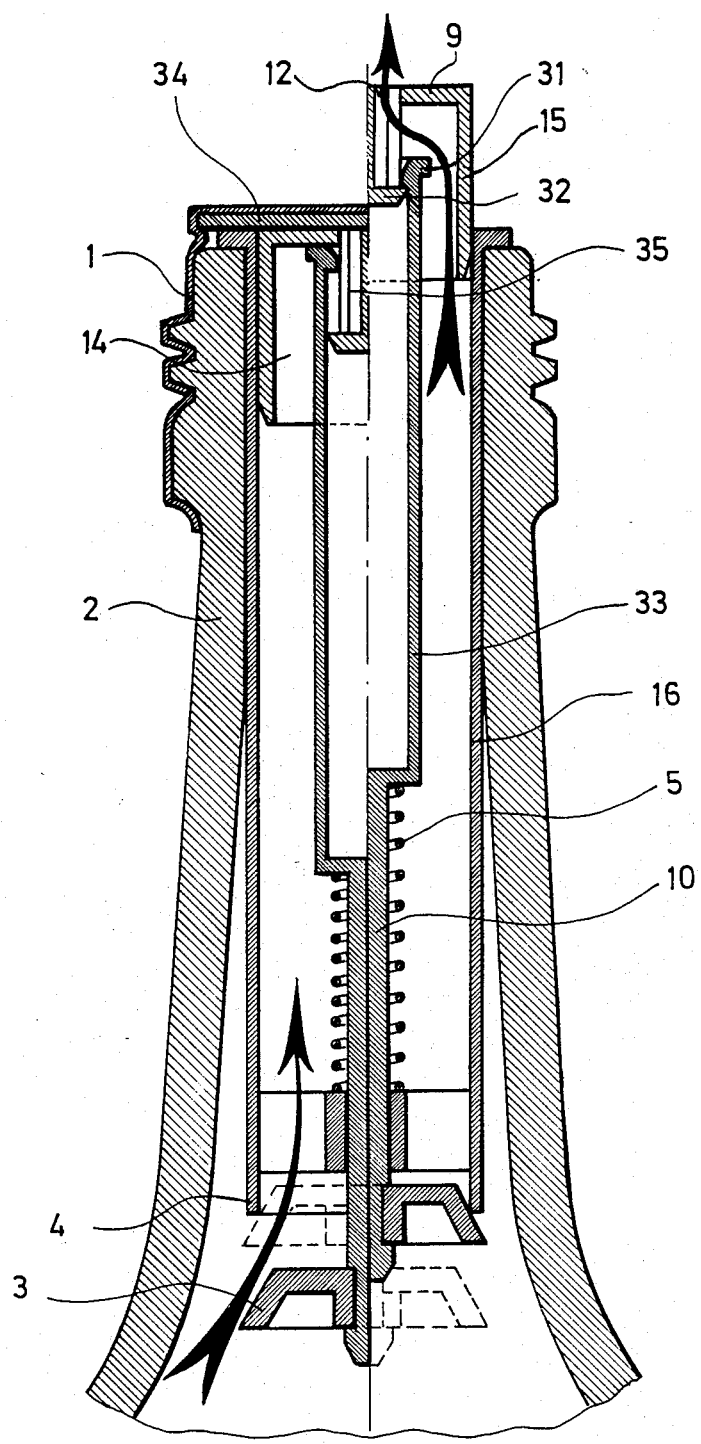

According to still another embodiment of the invention as shown in FIGS. 7 and 8, the valve stem is biased by a resilient element towards a position in which its upper end obturates an orifice formed at the center of the bottom wall of a closure cap or of a plug slidingly and sealingly displaceable in or on the cylindrical wall fixedly inserted in the container's neck, the closure cap or plug, respectively, being connected to the end portion of the valve stem in such a manner that it is freely displaceable between a position in which the central orifice is uncovered and a position in which the orifice is obturated by the end of the valve stem.

According to the above-named second aspect of the invention, the seat of the valve for opening and closing the passage between the interior of the container and the interior of a metering chamber is not formed at the lower end of a cylindrical wall fixedly inserted into the neck of a container, but on an intermediate element sealingly secured by any known means to the rim of an orifice formed in a container, the intermediate element itself being formed with a neck portion cooperating with a closure cap for sealingly closing the container.

In view of the above it is to be noted that the chosen designations such as closure cap, plug, valve member, resilient element and the like are to be interpreted in their broadest sense, encompassing different shapes, sizes and materials of these elements as well as their assembly or relationship relative to one another.

Figure 3:
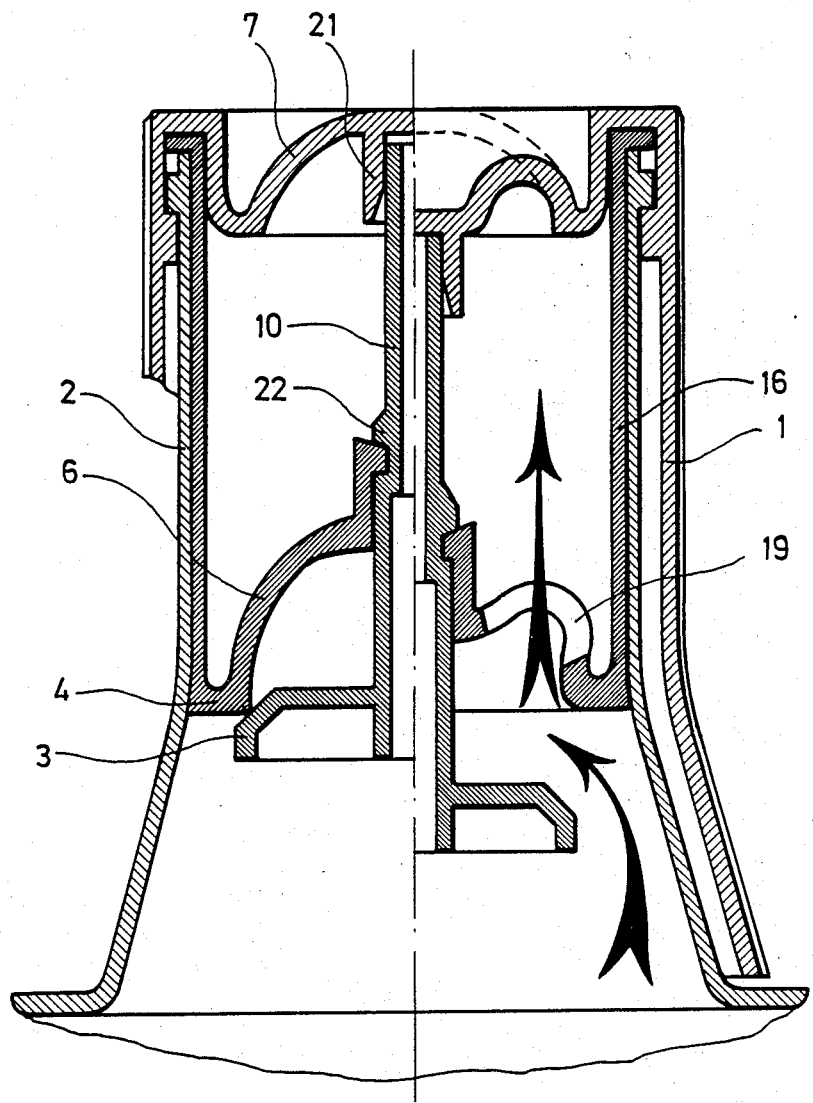
Figure 6:
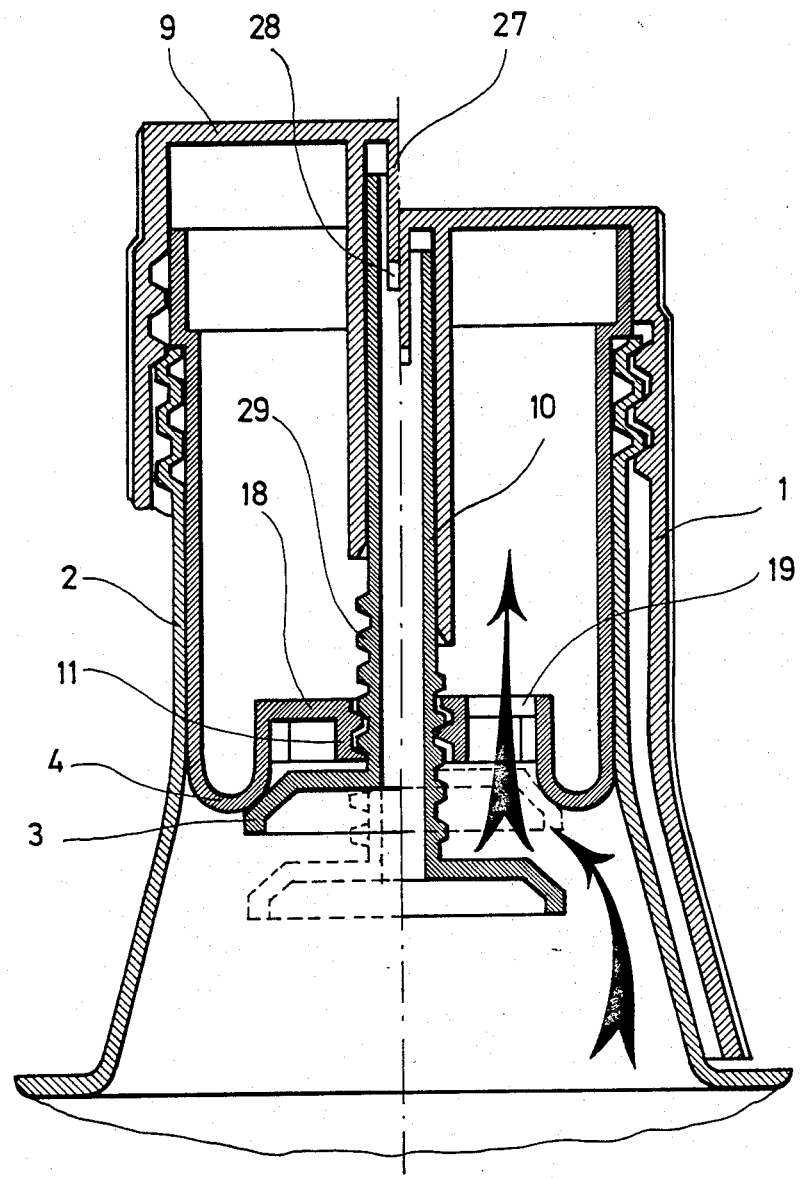
Figures 8A, 8B, 8C:
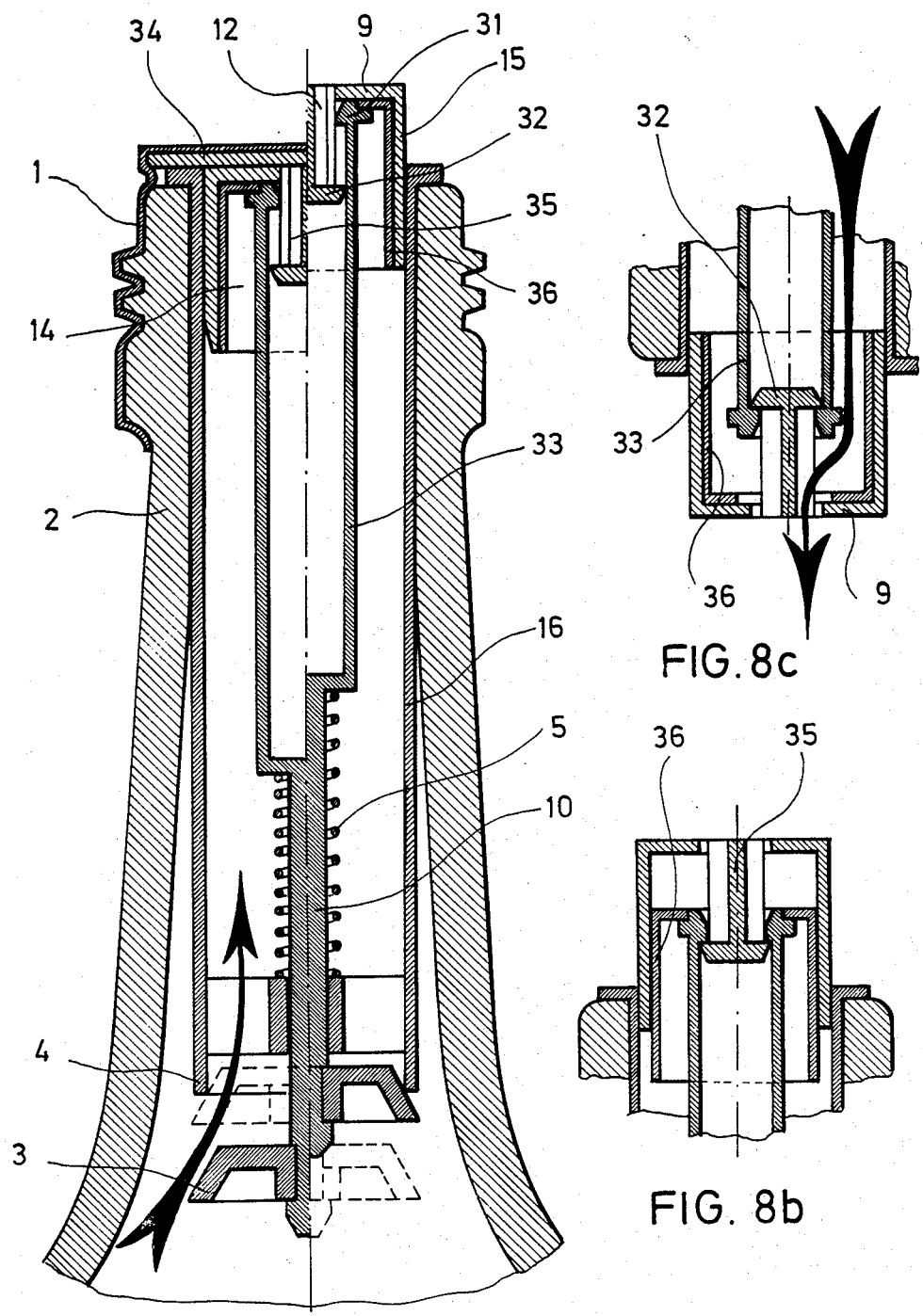
Figure 9:
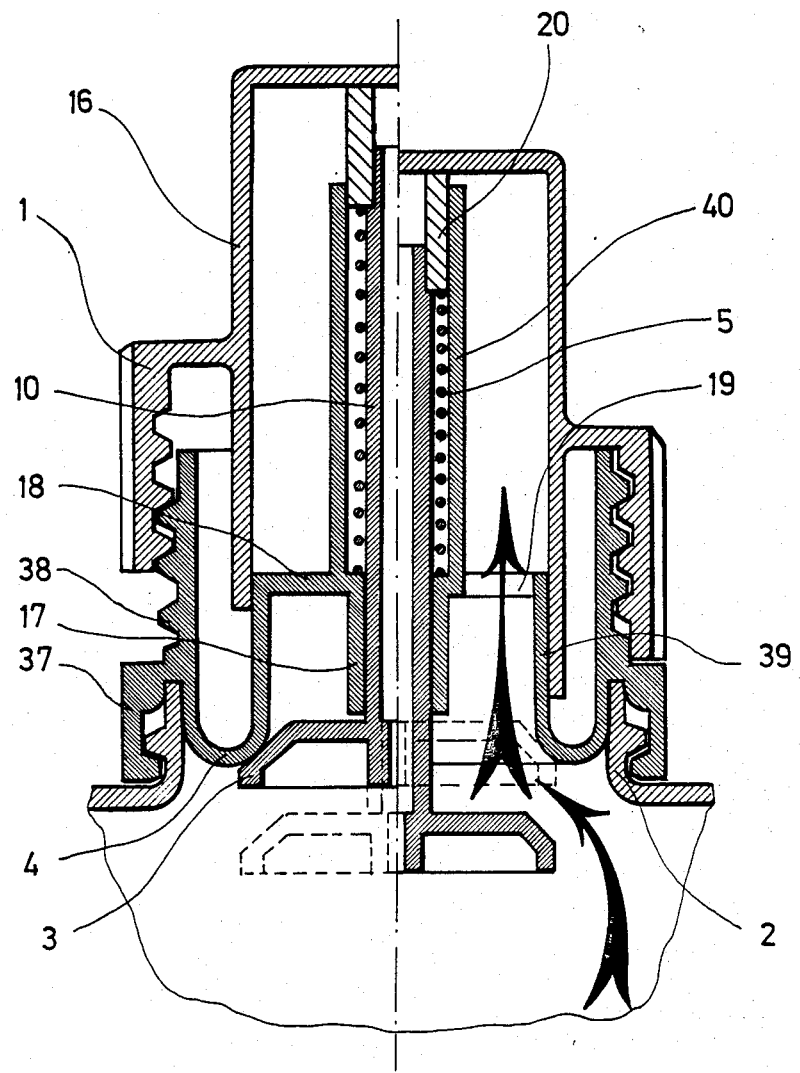
Figure 10A:
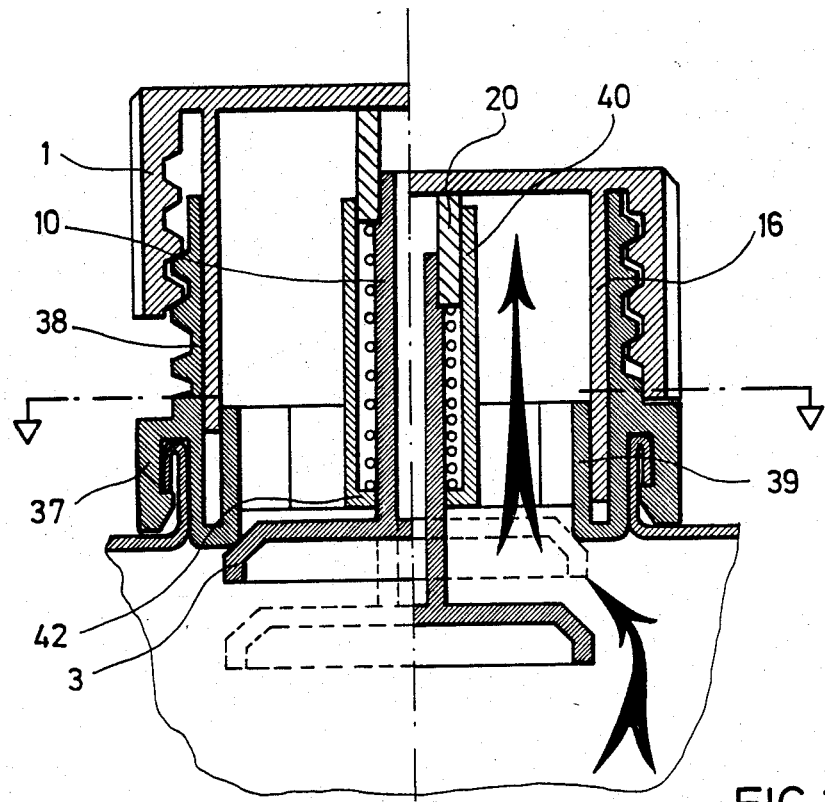
Figure 10B:
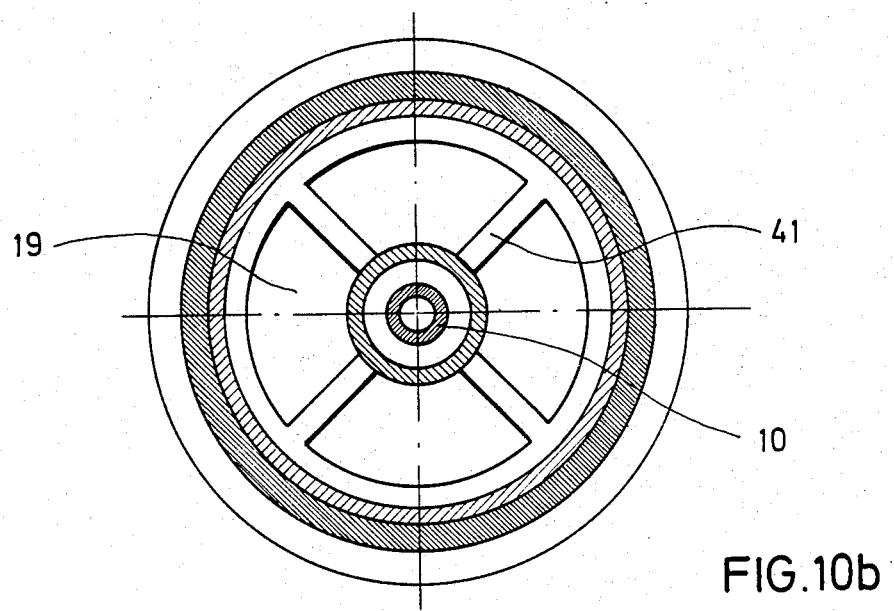

Further objects, characteristics and advantages of the present invention will become more clearly evident from the following description, given by way of example with reference to the accompanying drawings, wherein:

FIG. 1 shows an embodiment in which a closure cap 1 screwed down on the neck 2 of a container acts to lift a valve member 3 off its seat, while unscrewing of the closure cap 1 permits a compression spring 5 to return the valve member 3 onto its seat 4, FIG. 2 shows a modification of the embodiment of FIG. 1, in which the compression spring 5 is replaced by a cambered resilient diaphragm 6 integrally formed with the seat 4, FIG. 3 shows an embodiment in which the opening of the valve member 3 is controlled by depressing a cambered bottom wall 7 of the closure cap 1, FIG. 4 shows an embodiment in which a displacement of a plunger 8 slidingly mounted at the center of the bottom wall 9 is effective to lift the valve member 3 off its seat 4 when the container is closed by the closure cap 1, FIG. 5 shows an embodiment in which the valve member 3 is displaceable in opposite directions without the aid of a resilient element by the direct action thereon of the closure cap 1 as it is axially displaced, FIG. 6 shows a modification of the embodiment of FIG. 5, in which the rotation of the closure cap 1 as it is screwed onto the container's neck is transmitted to a screw-threaded stem 10 of the valve member 3 engaged in a screw-threaded bushing 11 foremd at the center of the seat 4, FIGS. 7a and 7b show different embodiments, in which the closure cap has an orifice 12 formed at the center of its bottom wall and remains attached to the end portion 13 of the valve stem 10 in its unscrewed state, in which the spring 5 biases the valve member 3 into engagement with its heat 4, FIG. 8 shows a modification of the embodiment of FIG. 7, in which a plug 14 having an orifice 12 formed at the center of its bottom wall 9 and having a tubular peripheral wall 15 is slidingly and sealingly supported in a cylindrical wall 16 fixedly inserted into the neck 2, and connected to the end portion 13 of the valve stem 10, FIGS. 8a to 8c show a modification of the embodiment of FIG. 8, including means for positively preventing the container from being filled through the metering device, FIG. 9 shows an embodiment substantially corresponding to the one shown in FIG. 1 for use on a container having a very short neck, if any, and FIGS. 10a and 10b show a modification of the embodiment shown in FIG. 9.

Identical or equivalent components are designated by the same reference numerals throughout the figures of the drawings and the following detailed description.

In the embodiment shown in FIG. 1, a valve stem 10 is slidingly supported in a bushing 17 formed at the center of a cylindrical wall 16, a planar wall 18 having at least one orifice 19 connecting bushing 17 to a seat 4 of a valve member 3.

A compression spring 5 disposed between the upper end of bushing 17 and the lower end of a bushing 20 fixedly secured to the end of valve stem 10 acts to bias valve member 3 onto seat 4.

In the position shown in FIG. 1 to the right of the centerline, a closure cap 1 is screwed down on a neck 2 of a container to sealingly close it and to thereby lift valve member 3 off its seat 4 against the bias of spring 5.

For dispensing the desired dose, the thus closed container is inverted to a head-down position, and closure cap 1 is unscrewed while maintaining the container in this position. As closure cap 1 is thus being unscrewed, spring 5 acts on valve stem 10 to seat valve member 3 on seat 4 to thereby stop the flow of the product from the container. This position is reached before closure cap 1 is completely unscrewed, as shown in FIG. 1 to the left of the centerline.

A cylindrical wall 21 projecting downwards from the center of closure caps 1 cooperates with bushing 17 to safely guide valve stem 10 as closure cap 1 is screwed back onto neck after the dose metered into the closure cap has been dispensed therefrom.

In a modification of the embodiment of FIG. 1 as shown in FIG. 2, compression spring 5 is replaced by a cambered diaphragm 6 provided with at least one orifice 19 and integrally formed with cylindrical wall 16.

In the position shown in FIG. 2 to the right of the vertical centerline, closure cape 1 is screwed down on neck 2 to sealingly close the container. In this position an annular shoulder 22 on valve stem 10 acts on diaphragm 6 to keep it depressed as valve member 3 is lifted off its seat 4.

The operation of the device shown in FIG. 2 is identical to that of the FIG. 1 embodiment.

In the embodiment shown in FIG. 3, closure cap 1 is fixed on neck 2 of a container in a resilient snap fit, by a bayonet coupling or in any similar manner to thereby sealingly close the container while valve member 3 remains engaged with seat 4 as shown in FIG. 3 to the left of the vertical centerline.

For dispensing the desired dose it is thus not sufficient to turn the container upside down, this action having to be accompanied by depressing the center of the cambered diaphragm 7 forming the bottom wall of closure cap 1 to thereby lift valve member 3 off its seat 4 so that the product flows from the container into the metering chamber defined by cylindrical wall 16.

The position shown to the right of the vertical centerline in FIG. 3 corresponds to this operating state of the device.

The metering device shown in FIG. 4 is a modification of th embodiment of FIG. 3, in which the cambered deformable bottom wall 7 of FIG. 3 is replaced by a plunger 8 slidingly and sealingly guided in a cylindrical wall 23 projecting downwards from the center of bottom wall 9 of closure cap 1.

The operation of this modification is identical to that of the embodiment shown in FIG. 3.

The two last-described embodiments are particularly suitable for use with containers having closure means of the bayonet coupling or resilient snap fit type, and in which the permanent deformation of the resilient elements is to be avoided.

In the embodiment of FIG. 5, as closure cap 5 is screwed down onto neck 2, an annular bead 24 formed inside circular wall or bushing 21 bears on an annular bead 25 formed on valve stem 10, so that the latter is pushed down to the position shown in FIG. 5 to the right of the vertical centerline. In this position an annular shoulder 26 of valve stem 10 seats on bushing 17, so that further tightening of closure cap 1 on neck 2 causes annular bead 24 to ride over annular bead 25 shortly before the container is hermetically closed by the closure cap, as shown by dotted lines to the right of the centerline in FIG. 5. In this manner closure cap 1 is connected to valve stem 10 by a resilient snap fit.

The operation of this device is in all points analogous to that of the previously described embodiments.

For dispensing the desired dose, the closed container is turned upside down, whereupon closure cap 1 is unscrewed. The engagement of the two annular bead 24 and 25 causes valve stem 10 to be pulled to the position shown to the left of the centerline in FIG. 5, in which valve member 3 engages its seat 4 to thereby close the passage between the interior of the container and the interior of cylindrical wall 16. Further unscrewing closure cap 1 causes annular bead 24 to ride over annular bead 25 to thereby permit the closure cap containing the metered dose to be separated form the container.

In a modification of the embodiment of FIG. 5 as shown in FIG. 6, a blade 27 projecting downwards from bottom wall 9 of closure cap 1 engages a slot 28 formed in the top end portion of valve stem 10 to thereby entrain the valve stem in rotation as closure cap 1 is screwed down onto neck 2 or unscrewed therefrom.

Valve stem 10 has a screw-threaded portion 29 received in a screw-threaded bushing 11, so that its rotation causes valve member 3 to be lifted off its seat 4 in the position, in which closure cap 1 seals the container, and to be engaged with seat 4 as closure cap 1 is completely unscrewed.

The operation of this device is identical to that previously described.

In the embodiment shown in FIG. 7, the bushing 20 fixedly secured to the end of valve stem 10 is biased by compression spring 5 to obturate an orifice 12 formed at the center of bottom wall 9 in the position shown in FIG. 7 to the right of the vertical centerline, in which closure cap 1 sealingly closes the container.

For dispensing a desired dose, the closed container is turned upside down and closure cap 1 is unscrewed in this position.

At the beginning of the unscrewing operation, bushing 20 is biased by compression spring 5 to maintain orifice 12 closed until valve member 3 rests on seat 4, whereupon valve stem 10 is prevented from moving further, This causes orifice 12 to be uncovered, permitting the metered dose retained within cylindrical wall 16 to escape therefrom through at least one passage 30 formed in cylindrical wall 21.

In its completely unscrewed state closure cap 1 remains attached to valve stem 10 by the mutual engagement of shoulders 31 and 32 formed on bushings 20 and 21, respectively.

FIG. 8 shows a modification of the embodiment of FIG. 7 which is particularly useful for containers such as glass bottles having a relatively long neck.

In the position shown to the left of the vertical centerline in FIG. 8, in which closure cap 1 hermetically seals neck 2 of the container with the aid of a sealing gasket 34, a tubular end portion 33 of valve stem 10 is biased by spring 5 into engagement with the bottom wall 9 of a plug 14 to thereby obturate orifice 12 formed at the center thereof.

For dispensing the desired dose, closure cap 1 is removed by unscrewing it from neck 2, whereupon the container is turned upside down and neck 2 is pushed down onto the rim or the bottom of a suitable receptacle, whereby plug 14 is depressed to the above defined position in which the product container in the container is permitted to flow into the metering chamber defined by cylindrical wall 16.

Subsequent lifting of the container causes plug 14 to be initially pushed outwards by the tubular end portion 33 of valve stem 10 and to subsequently slide further by its own weight with its peripheral wall 15 in sealing engagement with cylindrical wall 16, to the position shown to the right of the vertical centerline, in which it remains attached to valve stem 10 by the mutual engagement of annular shoulders 31 and 32 while being freely movable relative thereto to a position in which orifice 12 is uncovered to thereby permit the product container within the confinements of cylindrical wall 16 to flow through a connecting cage 35 into the selected receptacle.

It is to be noted that in this embodiment a warranty seal made of a plastic material or metal and adapted to be destroyed when opening the container for the first time may be secured to the neck of the container by threaded engagement, in a snap fit or press fit or by any other known means.

After the container has been opened for the first time, the closure cap or warranty seal is no longer required, as the valve member 3 ensures hermetical sealing of the container.

In the embodiment shown in FIG. 8, even the employ of a warranty seal or the like cannot fully guaranty the autenticity of the product contained in the container. It would in fact be possible to fill the container with any other product by the successive introduction of metered doses thereof. This could be accomplished by lifting plug 14 to the position shown to the right of the vertical centerline in FIG. 8 and filling the metering chamber through orifice 12, followed by depressing plug 14 to the position in which valve member 3 opens the passage towards the interior of the container.

To exclude this possibility of fraud, a modification of the embodiment shown in FIG. 8 is shown in FIG. 8a to comprise a cup-shaped member 36 formed with a central opening and slidably supported with plug 14 between a position in which it rests on bottom wall 9 of plug 14 to thereby open the passage from the interior of the metering chamber to the exterior of the device, and a second position in which it rests on the end face 39 of the tubular end portion 33 of valve stem 10 to thereby obturate the above mentioned passage.

Otherwise the operation of the modification of FIG. 8a is similar to that of the embodiment shown in FIG. 8.

Shown in FIG. 9 is a metering device similar to the embodiment shown in FIG. 1, for use with a container having a very short neck, if any. In this embodiment, a cylindrical wall 39 formed integrally with valve seat 4 is in sealingly sliding engagement with the interior surface of cylindrical wall 16 which in this case is integrally formed with the flat bottom wall of closure cap 1 so as to project downwards therefrom. Cylindrical wall 39 forms part of an intermediate element 37 having an integrally formed neck portion 38 and being secured to the short neck 2 of a container by a resilient snap fit. The lower portion of the peripheral wall of closure cap 1 is in threaded engagement with threads formed on neck portion 38.

A tubular element 40 formed integrally with a bottom wall 18 of intermediate element 37 protects compression spring 5 from contact with the product to be dispensed from container.

The operation of the device shown in FIG. 9 is similar to that of the embodiment shown in FIG. 1.

In a modification of the FIG. 9 embodiment shown in FIG. 10, bottom wall 18 of intermediate element 37 is replaced by radial webs 41 to thereby increase the cross-sectional area of the passage between the interior of the container and the interior of the metering chamber.

The larger diameter of cylindrical wall 16 in this embodimen permits the metering chamber to be completely disposed below the flat bottom wall of closure cap 1.

The operation of the modification of FIG. 10 is similar to that of the embodiment shown in FIG. 9.

The embodiment shown in FIG. 9 and its modification of FIG. 10 offer certain advantages over the various embodiments shown in FIGS. 1 to 8. In the first place, the screwthreaded circumferential wall of closure cap 1 remains clean as the metering chamber is being filled. This is because the cylindrical wall 16 formed integrally with closure cap 1 completely separates the screw-threaded portion of the closure cap from the metering chamber. In the second place, the screw-threaded peripheral wall of closure cap 1 remains clean also as the metering chamber is emptied, because the axial length of cylindrical wall 16 is greater than that of the peripheral wall of closure cap 1. In the third place, a rapid filling of the metering chamber is achieved due on the one hand to the increased crosssectional area of the passages between the interior of the container and the metering chamber, and on the other hand to the vacuum created in the metering chamber as the closure cap is unscrewed during the filling operation. The spring 5 is completely isolated from the product to be metered by the tubular element 40.

The metering device does not require the admission of ambient air to the interior of the container as the entering chamber is being filled. In the filling position the metering chamber is completely isolated from ambient air while communicating with the interior of the container through a wide passage, permitting ghe product to flow from the container into the metering chamber without creating a vacuum within the container. The filling operation is accelerated by unscrewing the closure cap while maintaining a hermetic seal in that the resulting increase of the volume of the metering chamber creates a suction effect in its interior.

According to the embodiment of FIG. 10, a closure cap of reduced height and conventional shape may be realized by the provision of a metering chamber defined by a cylindrical wall of increased diameter and reduced height.

The intermediate element of these embodiments may be made of a plastic material and secured to the neck or to the rim of an opening formed in a container as by means of a bayonet coupling, by a resilient snap fit, by adhesive bonding, by welding or in any other suitable manner.

It is to be understood that the embodiments of the invention described above and illustrated by way of example may undergo various modifications and alterations without thereby leaving the scope of the invention.

It is also to be understood that the invention is not restricted to the specific applications described above.

I claim:

1. A metering and dispensing device for fluid product contained in a container sealingly closed by a removable closure cap, with a metering chamber delimited by a cylindrical wall fixedly and sealingly inserted in a neck of said container and closably opened, at its lower end, by an axially displaceable valve member, fixedly connected to an upwardly extending stem, and closed, at its upper end, by the bottom wall of said closure cap and with means for displacing the valve member in its opening direction when said closure cap is in its position for closing the container and for returning the valve to its closing position before removing said closure cap;

said cylindrical wall has, at its lower end, an inlet opening and an associated valve seat, said closure cap is adapted, on displacement toward its position for closing said container, to push said valve member stem in a direction for moving said valve member off said valve seat, and said means for displacing said valve member include resilient means for returning said valve member towards said valve seat in response to displacement of said closure cap in the opposite direction;

said resilient means include a spring element circumscribing said valve stem, and;

an internal cylindrical surface portion of the upper rend portion of said cylindrical wall is slidingly and sealingly engaged by a cylindrical portion of said closure cap during outward axial displacement relative to said neck of said container until after said valve member is seated to thereby prevent flow through the cylindrical wall's upper end prior to the seating of the valve member.

2. A metering and dispensing device according to claim 1 wherein:

the closure cap further includes a second cylindrical wall projecting downwards from the center of said cap to serve as a guide for the upwardly extending valve stem as the closure cap is axially displaced relative to the neck of the container.

3. A metering and dispensing device according to claim 1 wherein:

the closure cap has an orifice formed at the center of the bottom wall of said closure cap;

said valve stem has an upper end portion which obturates the orifice in the closure cap when the cap is positioned to sealingly close the container, the valve member being axially displaced in its open position relative to the valve seat, and;

the upper end portion of the valve stem is biased by the resilient means to obturate the oriface during outward axial displacement of the closure cap from the container closing position until the valve member reaches its closing position, whereupon the orifice is no longer obturated by the valve stem upon further outward axial displacement of the closure cap after the valve member is seated, so that a metered amount can escape through the orifice with the container inverted.

4. A metering and dispensing device according to claim 3 wherein:

the closure cap has a second cylindrical wall surrounding the orifice, depending downward from said bottom wall, said second cylindrical wall having means for engaging the upper end portion of the valve stem, and at least one passageway in the second cylindrical wall between the metering chamber and the orifice, and;

said valve stem has at its upper end portion a complimentary means for engaging, adapted to engage the means for engaging on said second cylindrical wall only after said further outward axial displacement of the closure cap, with the valve member closed, has moved the bottom wall away from the upper end portion of the valve stem thereby opening the orifice, said closure cap being restrained by the engaging means from complete removal from the neck of the container.

5. A metering and dispensing device for fluid product contained in a container sealingly closed by a removable closure cap, with a metering chamber delimited by a cylindrical wall fixedly and sealingly inserted in a neck of said container and closably opened, at its lower end, by an axially displaceable valve member, integrally formed with an upwardly extending stem, and closed, at its upper end, by the bottom wall of said closure cap and with means for displacing the valve member in its opening direction when said closure cap is in its position for closing the container and for returning the valve to its closing position before removing said closure cap;

said cylindrical wall has secured thereto a central cylindrical portion which defines a valve seat and an inlet opening into said metering chamber, and an externally threaded neck extension portion which extends upwardly from the container neck;

said closure cap has a radially outer, internally threaded wall section adapted to threadingly engage said neck extension portion, and a central cylindrical portion which, at a lower end portion thereof, slidably engages said central cylindrical portion of said cylindrical wall and forms therewith said metering chamber; and said valve stem is axially displaceable by said closure cap to seat and unseat said valve member on and from said valve seat in such a manner that said valve member is separated from said valve seat when said container is closed by said closure cap, while in the opened state of said container said valve member is forced into engagement with said valve seat to thereby prevent fluid flow into said metering chamber through said inlet opening.

6. The metering an dispensing device of claim 5 wherein:

said central cylindrical portion of said closure cap is sized to receive the entire metered amount of fluid dispensed from said container to thereby prevent fluid contamination of said radially outer wall section of said closure cap and said neck extension portion during dispensing of the fluid from within said container.

7. The metering and dispensing device of claim 5 wherein:

said means for displacing the valve member include an elongated spring element circumscribing said valve stem and bearing at its opposite ends against a portion of said valve stem and said central cylindrical portion of said cylindrical wall.

8. The metering and dispensing device of claim 7 wherein:

said valve stem has a radially enlarged upper end portion, and said spring element bears, at its upper end, upon said radially enlarged upper end portion of said valve stem.

9. The metering and dispensing device of claim 8 wherein:

said central cylindrical portion of said cylindrical wall has an axially upwardly projecting cylindrical sleeve portion which circumscribes said spring element and, at its upper end, slidably and sealingly receives said radially enlarged upper end portion of said valve stem, said central cylindrical portion of said cylindrical wall further having a downwardly projecting sleeve portion which slidingly and sealingly receives said valve stem below said spring element, whereby said spring element is isolated from fluid in said container and in said metering chamber.

* * * * *